United States Patent [19]

Kim et al.

[11] Patent Number: 5,528,346
[45] Date of Patent: Jun. 18, 1996

[54] POWER-SAVING PRINTING METHOD OF A PRINTING SYSTEM

[75] Inventors: Gyung-Yeol Kim; Duk-Soo Kim, both of Kyngki-do, Rep. of Korea

[73] Assignee: SamSung Electronics Co., Ltd., Kyungki-do, Rep. of Korea

[21] Appl. No.: 366,599

[22] Filed: Dec. 30, 1994

[30] Foreign Application Priority Data

Dec. 30, 1993 [KR] Rep. of Korea ............... 31315/1993

[51] Int. Cl.$^6$ ............ G03G 21/00; G03G 15/20
[52] U.S. Cl. ............ 355/204; 355/285; 219/216
[58] Field of Search .................. 355/204, 208, 355/206, 282, 285; 219/216

[56] References Cited

U.S. PATENT DOCUMENTS

| | | | |
|---|---|---|---|
| 4,452,136 | 6/1984 | Boynton et al. | 101/93.05 |
| 4,642,448 | 2/1987 | Shigemura et al. | 219/216 |
| 4,704,699 | 11/1987 | Farina et al. | 364/525 |
| 4,734,739 | 3/1988 | Inuzuka et al. | |
| 4,745,436 | 5/1988 | Matsuura . | |
| 4,837,735 | 6/1989 | Allen et al. | 364/513 |
| 4,870,526 | 9/1989 | Murata et al. | 355/206 x |
| 4,980,836 | 12/1990 | Carter et al. | 364/483 |
| 5,016,052 | 5/1991 | Sambayashi et al. | 355/228 |
| 5,081,493 | 1/1992 | Miyasaka | 355/208 |
| 5,109,255 | 4/1992 | Nishikawa et al. | 355/285 |
| 5,134,317 | 7/1992 | Ohta | 307/482 |
| 5,140,445 | 8/1992 | Takashima et al. | 358/483 |
| 5,151,573 | 9/1992 | Masuda | 219/216 |
| 5,321,478 | 6/1994 | Nakamura et al. | 355/285 |

*Primary Examiner*—R. L. Moses
*Attorney, Agent, or Firm*—Robert E. Bushnell

[57] ABSTRACT

A power-saving printing method that wakes up an image-forming device prior to a print operation in order to reduce an extended print time resulting from a warm-up period of the device. One embodiment of the method includes the steps of: establishing a power-saving mode when the image-forming device has not received a print code for a predetermined period of time, determining whether a wake-up control code is included in a received print code, performing a wake-up operation and establishing a print ready state when the warm-up control code is included, and performing an operation corresponding to the received print code after the wake-up operation is performed when the wake-up control code is not included.

18 Claims, 4 Drawing Sheets

POWER-SAVING PRINTING METHOD OF A PRINTING SYSTEM

CROSS-REFERENCE TO RELATED APPLICATIONS

This application makes reference to, incorporates herein and claims all benefits accruing under 37 C.F.R.§119 from our application earlier filed in the Korean Industrial Property Office on 30 Dec. 1993 of our application entitled A POWER SAVING PRINTING METHOD OF A PRINTING SYSTEM, which application was duly assigned Serial No. 31315/1993.

BACKGROUND OF THE INVENTION

The present invention relates to a printing system using a power-saving printing method, and more particularly to a power-saving printing method of a printing system comprised of a computer providing information and an image-forming device connected thereto. The power-saving printing method activates the image-forming device prior to a print operation in order to reduce an extended print time resulting from a warm-up period of the image-forming device.

Recently, an energy star computer program sponsored by the U.S. Environmental Protection Agency (EPA) allows manufacturers of energy efficient office equipment complying with specified contractual terms and conditions to use a designated energy star logo indicating the energy efficiency of their product. The energy star computer program is a cooperative effort between the U.S. Environmental Protection Agency and computer device manufacturers to promote the production and sale of energy efficient office equipment. The program is particularly aimed at reducing air pollution resulting from the generation of power necessary to operate currently available office equipment. Accordingly, the program encourages the production of office equipment having power-saving features. Such equipment consumes less power, and thus helps reduce the production of air pollution.

To reduce power consumption, many devices, for example electrophotographic printers, are equipped with operational controllers for placing the device into a power-saving mode during periods of non-use. With electrophotographic printers, however, withdrawal of the device from the power-saving mode, upon entry of a print code can cause a user to experience an inconvenient delay before printing actually commences because the device requires a warm-up period. The problem of not knowing how long a warm-up period will last has long plagued the art as evidenced by the recently issued U.S. Pat. No. 5,293,463 entitled Image Processing Apparatus issued on 8 Mar. 1994 to Masuda. This art provides an image processing apparatus adapted to inform a user of the time required to elapse before an image forming command can actually be executed, thereby attempting to eliminate user anxiety that might otherwise occur. Although such art keeps the user informed of the required time delay, it is our experience that most users demand more. That is, we have observed that users don't just want to know how long their inconvenience will last, rather they desire more efficient office equipment that, in fact, actually exhibits a reduction in delay time when operated under the same conditions.

Another recent effort directed towards power conservation is disclosed in U.S. Pat. No. 5,218,704 entitled Real-Time Power Conservation For Portable Computers issued on 8 Jun. 1993 to Watts, Jr. et al. Here, a portable computer employs a monitor to determine whether a CPU may rest based upon a real-time sampling of the CPU activity level. If the monitor determines the CPU may rest, a hardware selector reduces CPU clock time; if the CPU is to be active, the hardware selector returns the CPU to its previous high speed clock level. Since the CPU switches back into full operation from its rest state without any user input or request, we question whether there is any significant reduction in the amount of power consumption that actually results from this application.

SUMMARY OF THE INVENTION

Therefore, it is an object of the present invention is to provide an improved power-saving printing method for an image-forming device.

It is another object to provide a power-saving printing method for an image-forming device capable of improving printing speed by performing a warm-up operation of the device while in a power-saving mode, prior to printing.

It is still another object to provide a power-saving printing method for an image-forming device capable of performing a wake-up operation by entering a dummy print code which does not cause an actual printing operation, while in a power-saving mode.

It is still yet another object to provide a power-saving printing method for an image-forming device that performs a wake-up operation, while in a power-saving mode, in response to a warm-up command entered from a computer.

To achieve these and other objects, embodiments constructed according to the principles of the present invention provide an image-forming device and method for transmitting a dummy print code which does not cause an actual printing operation, when the image-forming device is an a power-saving mode, thereby performing a warm-up operation of the device.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
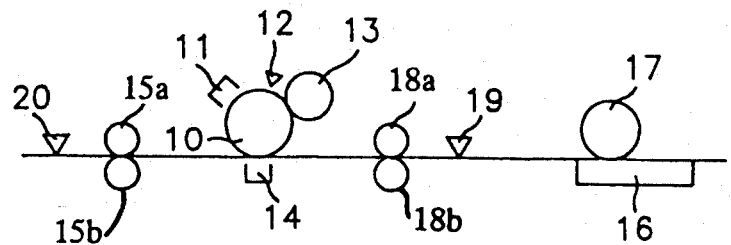
FIG. 1 illustrates a schematic diagram of an engine structure in an image-forming device.
Figure 2:
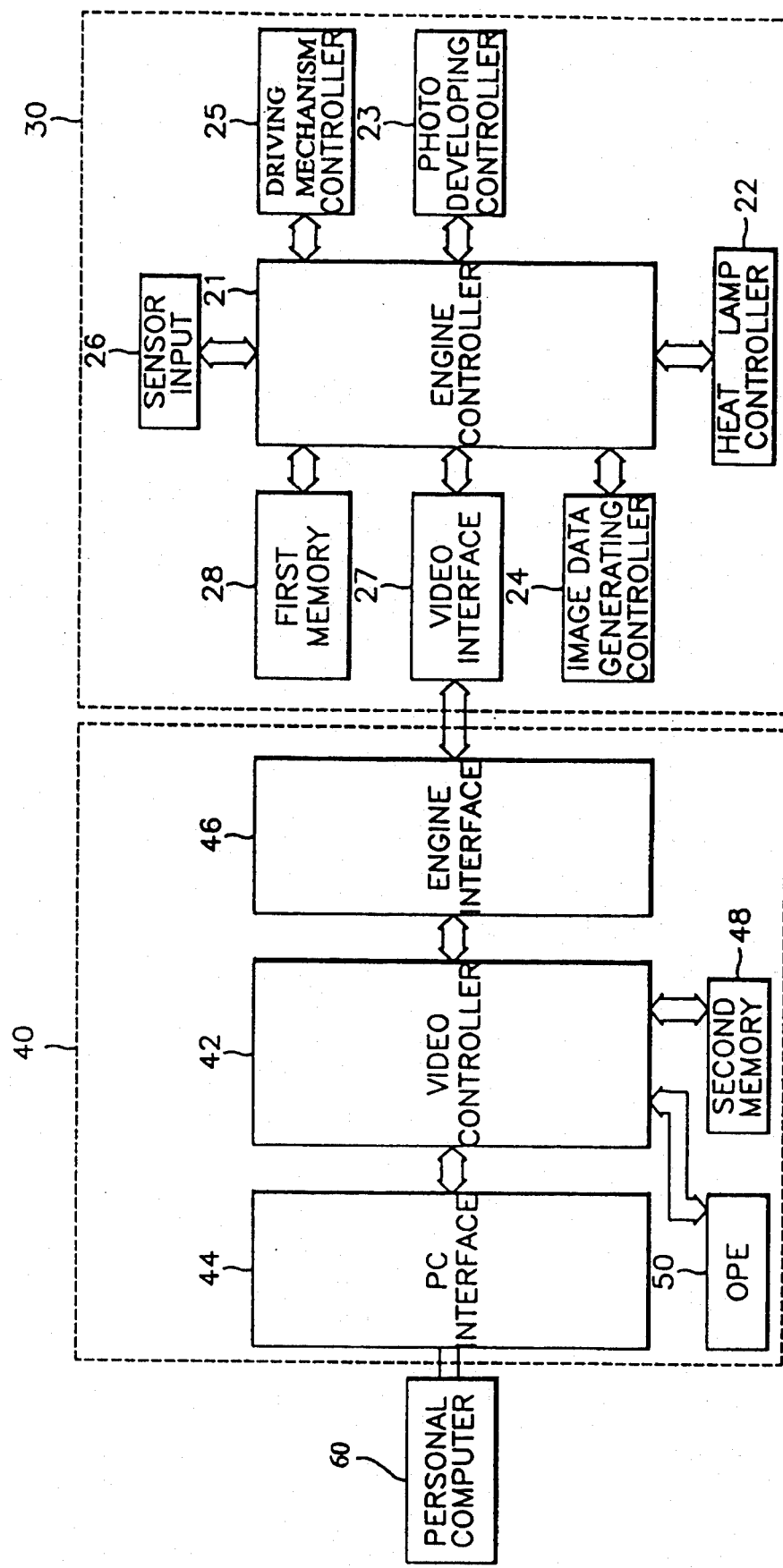
FIG. 2 illustrates a circuit diagram of an image-forming device.

General depictions of an engine structure and a control circuit for a Laser Beam Printer ("LBP") using an electrophotographic developing method are illustrated in FIGS. 1 and 2, respectively.

FIG. 1 shows the engine structure of an image-forming device. FIG. 1 includes a photosensitive drum 10, a charger 11 for generating a uniform electric charge on the surface of photosensitive drum 10, an exposure unit 12 for forming an electrostatic latent image on photosensitive drum 10, a developing unit 13 for transmitting toner to the electrostatic latent image formed on photosensitive drum 10, a transfer unit 14 for transferring toner formed on photosensitive drum 10 to paper or another printable medium, a fixing unit having a heat roller 15a (including a heat lamp) and a press roller 15b for affixing toner onto paper, a paper cassette 16 for storing paper, a pick-up roller 17 for picking up and conveying paper stacked within paper cassette 16, register rollers 18a and 18b for receiving and arranging paper conveyed from pick-up roller 17, and first and second paper sensors 19 and 20, respectively, for sensing the conveyance condition of paper.

FIG. 2 shows a circuit diagram of an image-forming device. The circuit includes an engine unit 30 and a video controller 40.

An engine controller 21 controls many components within the image-forming device. A heat lamp controller 22, which controls heat roller 15a of the fixing unit, is operated by engine controller 21. A photo developing controller 23 directs development of the electrophotographic process under the control of engine controller 21. An image data generating controller 24 for transmitting image data is also controlled by engine controller 21. A driving mechanism controller 25 carries out driving and control operations of the mechanical portions of the printer engine under the control of engine controller 21. A sensor input 26 receives signals detected from a plurality of sensors, and transfers the signals to engine controller 21. A video interface 27 provides an interface for signals transmitted between video controller 40 and engine unit 30. A first memory 28 stores a print control program and temporarily stores printing data. A computer interface 44 provides an interface for signals transmitted between video controller 40 and a computer 60. A video controller 42 converts data received from computer interface 44 to image data. An engine interface 46, connected to video interface 27, also provides an interface for signals transmitted between engine part 30 and video controller 40. An operating panel OPE 50 comprised of a plurality of keys for generating key data, provides key data to video controller 42 in response to key inputs. Operating panel OPE 50 also has a display device for displaying data transmitted from video controller 42. A second memory 48 stores a program that performs a printer warm-up operation and also temporarily stores video data output from computer interface 44.

The operation of an image-forming device having the major components described above, is as follows.

When the circuit of FIG. 2 begins operation, video controller 42 is initialized. During this time, fixing unit 15a and 15b of FIG. 1, under control from engine controller 21, begins to raise to the temperature for fixation. In other words, fixing unit 15a and 15b performs a warm-up operation to raise its temperature to a print ready condition.

When the temperature of fixing unit 15a and 15b reaches a requisite printing temperature, engine controller 21 informs video controller 40 of engine condition through video interface 27, and video controller 40 thereby initializes the image-forming device to the print ready condition.

As printing begins, photosensitive drum 10, charger 11, developing unit 13, transfer unit 14 and exposure unit 12 of FIG. 1 operate sequentially, as paper is fed from paper cassette 16. After paper is fed from paper cassette 26, it passes through register rollers 18a and 18b after passing first paper sensor 19. As paper passes first paper sensor 19, a paper sensing signal is transmitted to engine controller 21 through sensor input 26. Register rollers 18a and 18b receive and arrange the paper, and then convey the paper to transfer unit 14. At this time, engine controller 21, which receives the paper sensing signal from first paper sensor 19, controls image data generating controller 24 to enable the transfer of image data to exposure unit 12. Engine controller 21 also controls photo developing controller 23 in order to direct operation of developing unit 13.

While paper is conveyed to transfer unit 14 by register rollers 18a and 18b, exposure unit 12 transmits light corresponding to image data output from image data generating controller 24 of FIG. 2 onto photosensitive drum 10, thereby forming an electrostatic latent image thereon.

At that time, the exposed portion of photosensitive drum 10, namely, the portion on which the electrostatic latent image is formed, is prepared for printing by the transfer of toner from developing unit 13. Toner disposed upon the surface of photosensitive drum 10 is applied to paper transferred from register rollers 18a and 18b by means of transfer unit 14. Toner is then permanently affixed to the paper from the heat of heat roller 15a and press roller 15b of the fixing unit.

After completion of the above steps, all portions of the image-forming device terminate operations sequentially, and paper containing the transferred image is ejected to the exterior of the device. Once ejected, an engine driving motor for the device stops operation.

Figure 3:
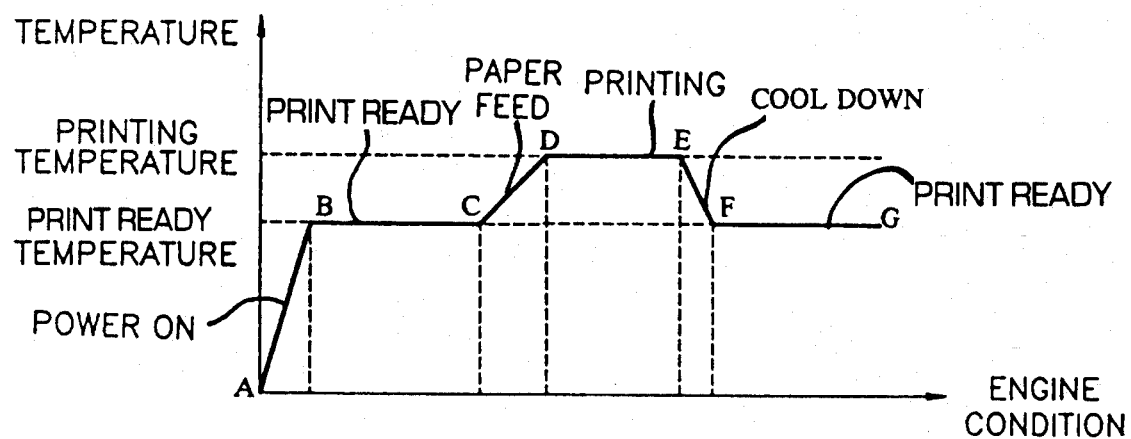
FIG. 3 is a graphical representation showing the relationship between heat lamp temperature and engine conditions in the described image-forming device.

FIG. 3 is a graphical representation showing the relationship between heat lamp temperature and engine conditions in the above described image-forming device. In other words, FIG. 3 plots temperature changes of the heat lamp versus engine conditions of the device during the various stages of the printing process. Reference characters A–G represent temperature transition points during this process. Segment AB represents the power on period. Segment BC represents a print ready period. Segment CD represents a paper feed period. Segment DE represents a printing period, while segment EF represents a cool down period. Segment FG also represents the print ready period. The abscissa of the graph shown in FIG. 3 is not drawn to scale. That is, the print ready period indicated is actually longer than the printing period. We have observed that whenever the print ready period is longer than the printing period, an unnecessary amount of power is consumed due to the heating of the heat lamp and operation of an exhaust fan. In order to prevent this unnecessary use of power, after the system has been in the print ready mode for a predetermined period of time (typically 15 minutes, according to an EPA standard), the system proceeds to a power-saving mode. In the power-saving mode, the fixing unit and exhaust fan turn off. Once in the power-saving mode, the fixing unit and exhaust fan must be warmed up again before performing the printing operation.

A conventional printing method that performs a warm-up operation is disclosed in Korean Patent Application No. #93-9170, assigned to the same assignee as the present invention. During execution of this conventional printing method, when a print code is entered from a computer or a key signal is input from operating panel OPE 50, video controller 42 generates a warm-up command pursuant to a program stored in second memory 48. The warm-up command is then transmitted to engine unit 30 through engine interface 46. Thereafter, the warm-up command is input to engine controller 21 through video interface 27. Pursuant to this command, engine controller 21 directs heat lamp controller 22 and driving mechanism controller 25 to control the fixing unit and exhaust fan, thereby implementing the warm-up operation.

After completion of the warm-up operation, engine controller 21 enters the print ready mode and informs video controller 42 that the warm-up operation has been completed. Thereafter, video controller 42 receives the print code from computer interface 44, converts the print code to image data and transmits the image data to engine unit 30. During this time, engine unit 30 receives image data and carries out the printing operation as described above.

In the conventional printing method such as that of Korean Patent application No. 93-9170, a laser beam printer in a power-saving mode begins a warm-up operation only after a print code is entered from the keyboard of a computer. Since the printer is in the power-saving mode, rather than the print ready mode, when the warm-up operation begins, the printing period becomes inconveniently long because the printer is required to completely warm-up before printing can commence.

Furthermore, the laser beam printer in a power-saving mode performs a warm-up operation after input of a key signal from operating panel OPE 50 and then performs the printing operation when a print command is entered. At that time, if the computer is installed away from the laser beam printer, there has been a problem in that a user must move to the location of the laser beam printer in order to perform the warm-up operation.

Figure 4:
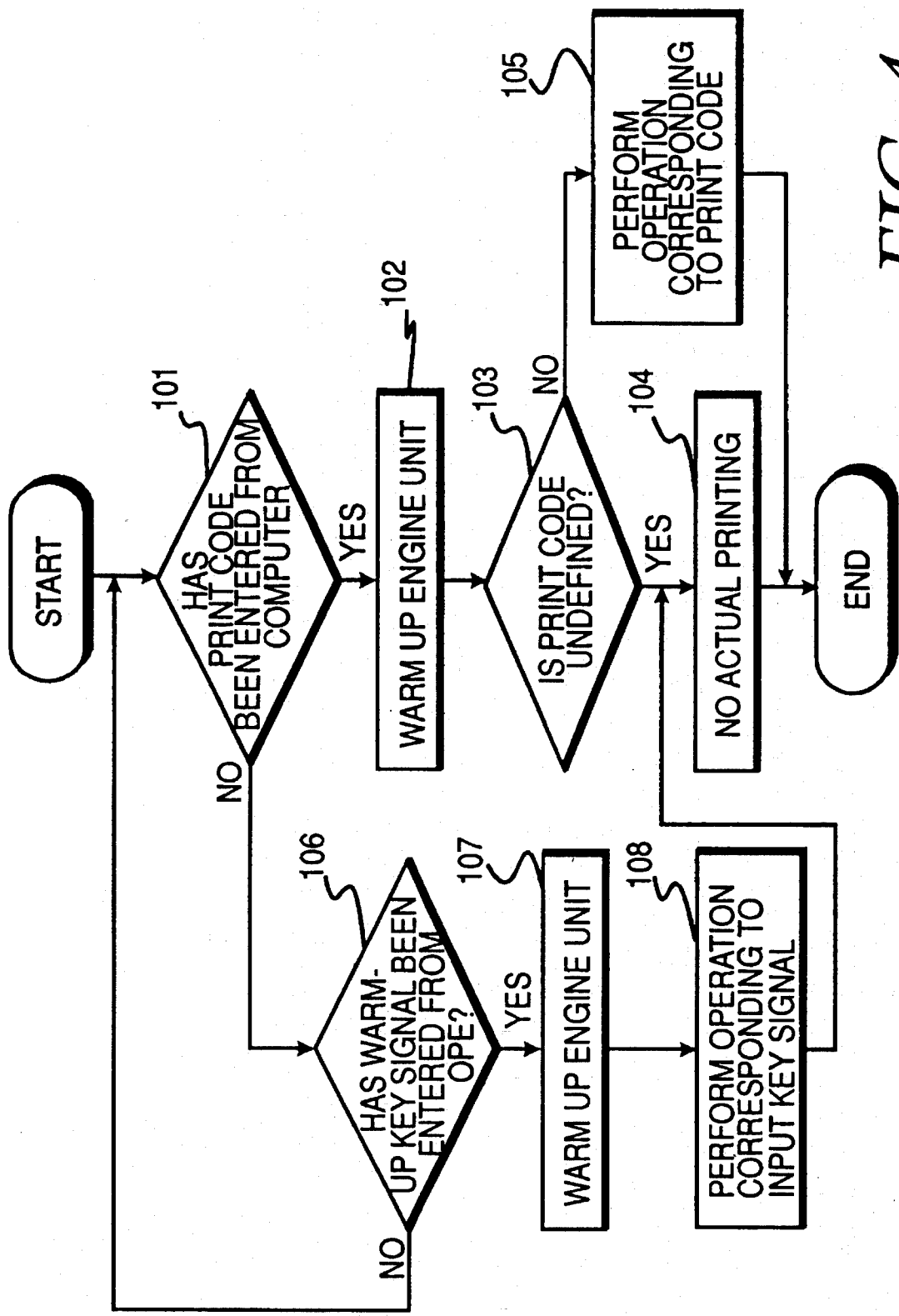
FIG. 4 is a flow chart showing a power-saving print control method according to one embodiment of the present invention.

FIG. 4 is a power-saving print control flow chart of a first embodiment of the present invention comprising the steps of determining whether a print code has been entered from a computer while the image-forming device is in a power-saving mode, performing a warm-up operation of the engine unit when the print code has been entered, determining whether the received print code is undefined print code, and performing an operation corresponding to the entered print code when the print code is determined not to be undefined print code. If the print code has not been entered from the computer, a determination is made as to whether a key signal has been entered from an operating panel. A warm-up operation of the engine unit is performed when the key signal has been entered, and then an operation corresponding to the entered key signal is performed.

A practical application of the first embodiment of the present invention is hereinafter described in detail with reference to the flow chart of FIG. 4 and the general structures shown in FIGS. 1 and 2.

While working on a computer, a user can enter a specific preset input if the image-forming apparatus is to be warmed-up in preparation for a printing operation after a predetermined period of time. The computer then checks for entry of the specific input and, if entered, transmits the specific print code to the image-forming device. This process is described below as follows.

First, in step 101, video controller 42 of FIG. 2 detects whether a print code has been entered from a computer 60 through computer interface 44. If the print code has been entered, step 102 is performed wherein video controller 42 transmits a warm-up signal to the engine unit to enable a warm-up operation. Here, the print code from the computer 60 is classified into a control code and a data code. The control code enables performance of a control command associated with the printing operation, while the data code indicates data to be printed. Different manufacturers of printers use different control and data codes. For example, in the case of print code such as ESC "ABC" DEF, the ESC key is the control code, the ABC key represents the content of the control code and the DEF key represents the data code due to the non-existence of the ESC key. Accordingly, in this case, the image-forming device actually prints the code DEF.

After video controller 42 transmits the warm-up signal to the engine unit for preparation of the print operation, video controller 42 determines, in step 103, whether the print code is undefined print code. If the print code is not undefined print code, but rather only a general print code, video controller 42 proceeds to step 105. In step 105, video controller 42 processes the print code input from computer 60 through computer interface 44, and performs the operation corresponding to the print code. For example, video controller 42 converts the data code within the print code to image data and transmits the image data to engine unit 30.

At this time, engine controller 21 determines whether the temperature of heat roller 15a is raised to a temperature necessary for printing. For proper printing, the temperature of heat roller 15a (and heat lamp) of the fixing unit must be raised to a temperature high enough to enable fixation of toner upon the paper as it passes through heat roller 15a and press roller 15b. If the printing temperature is detected, engine controller 21 controls driving mechanism controller 25 to operate the engine driving motor. Engine controller 21 then sequentially initiates operation of photosensitive drum 10, charger 11, developing unit 13, transfer unit 14 and exposure unit 12 of FIG. 1. Immediately thereafter, paper is fed out from paper cassette 16. As the paper passes through first paper sensor 19 and reaches register rollers 18a and 18b, the paper sensing signal from first paper sensor 19 is input to engine controller 21 through sensor input unit 26. In response, register rollers 18a and 18b receive and arrange the paper while conveying it forward to transfer unit 14. Then, engine controller 21 controls image data generating controller 25 to enable output of image data to exposure unit 12. Engine controller 21 also controls development controller 23 in order to direct operation of developing unit 13.

While paper is conveyed to transfer unit 14 by register rollers 18a and 18b, exposure unit 12 exposes photosensitive drum 10 with light corresponding to image data output from image data generating controller 14.

The exposed portion of photosensitive drum 10, namely, the portion where the electrostatic latent image is formed, is applied with toner from developing unit 13. As paper is transferred from register rollers 18a and 18b and engages with photosensitive drum 10, toner from the surface of photosensitive drum 10 is applied to the paper by transfer unit 14. Toner is permanently affixed to the paper as it passes between heat roller 15a and press roller 15b of the fixing unit. After the above operation is completed, each portion of the printing system terminates its operation sequentially, and paper imprinted with the electrostatic latent image is ejected to the exterior of the system.

If, however, in step 103 the print code is determined to be undefined print code, video controller 42 proceeds to step 104 where no actual printing is performed. In this case, dummy print code refers to a print code sent to the image-forming device from computer 60 that does not enable a printing operation. For example, if ECS "K+D+O+O" is entered as a print code, where ESC represents a control code and "K+D+O+O" represents the content of the control code, and if "K+D+O+O" is undefined according to the control program of the image-forming device (i.e. the dummy print code is undefined by the control program), video controller 42 would proceed to step 104.

If, in step 101, print code has not been entered from the computer, video controller 42 proceeds to step 106 to determine whether a signal has been entered from OPE 50. When the key signal has not been entered, video controller 42 loops back to step 101, and when the key signal has been entered, video controller advances to step 107. In step 107, video controller 42 generates a warm-up signal and transmits the warm-up signal to engine unit 30 through engine interface 46. At this time, engine controller 21 then outputs a lamp enable signal to heat lamp controller 22. In response, heat lamp controller 22 begins increasing the temperature of the heat lamp to the stand-by temperature. That is, the temperature of heat roller 15*a* (and heat lamp) of the fixing unit is raised to a temperature high enough to enable fixation of toner upon the paper as it passes through heat roller 15*a* and press roller 15*b*. Then, at step 108, video controller 42 performs an operation corresponding to the input key signal.

In another example of the first embodiment of the present invention, like "128" in Table B-5 ROMAN-8 in the user manual for the "Laserjet 4" model printer, published by Hewlett Packard in the United States, print code having an empty value is transmitted to the computer and the warm-up operation is performed. Here, since print code having an empty value (i.e. no assigned printable image or alphanumeric character or symbol), is transmitted, the actual printing operation is disregarded and no image is formed upon any print medium being transported through the image-forming device. The dummy print codes in this case can vary according to the type of print language.

In still another example of the first embodiment of the present invention, a font is downloaded from computer 60 to the image-forming device using a downloading function of the device. The downloaded font is stored in a memory of the image-forming device, but does not enable printing. The image-forming device however, performs the warm-up operation since the print code is externally input. Print codes which do not enable printing (i.e., that is, print codes that do not cause the image-forming device to creat an image upon the record medium within the image-forming device) can be used, as described above. The print codes described above which do not cause an actual printing operation are also referred to as dummy print codes.

Figure 5:
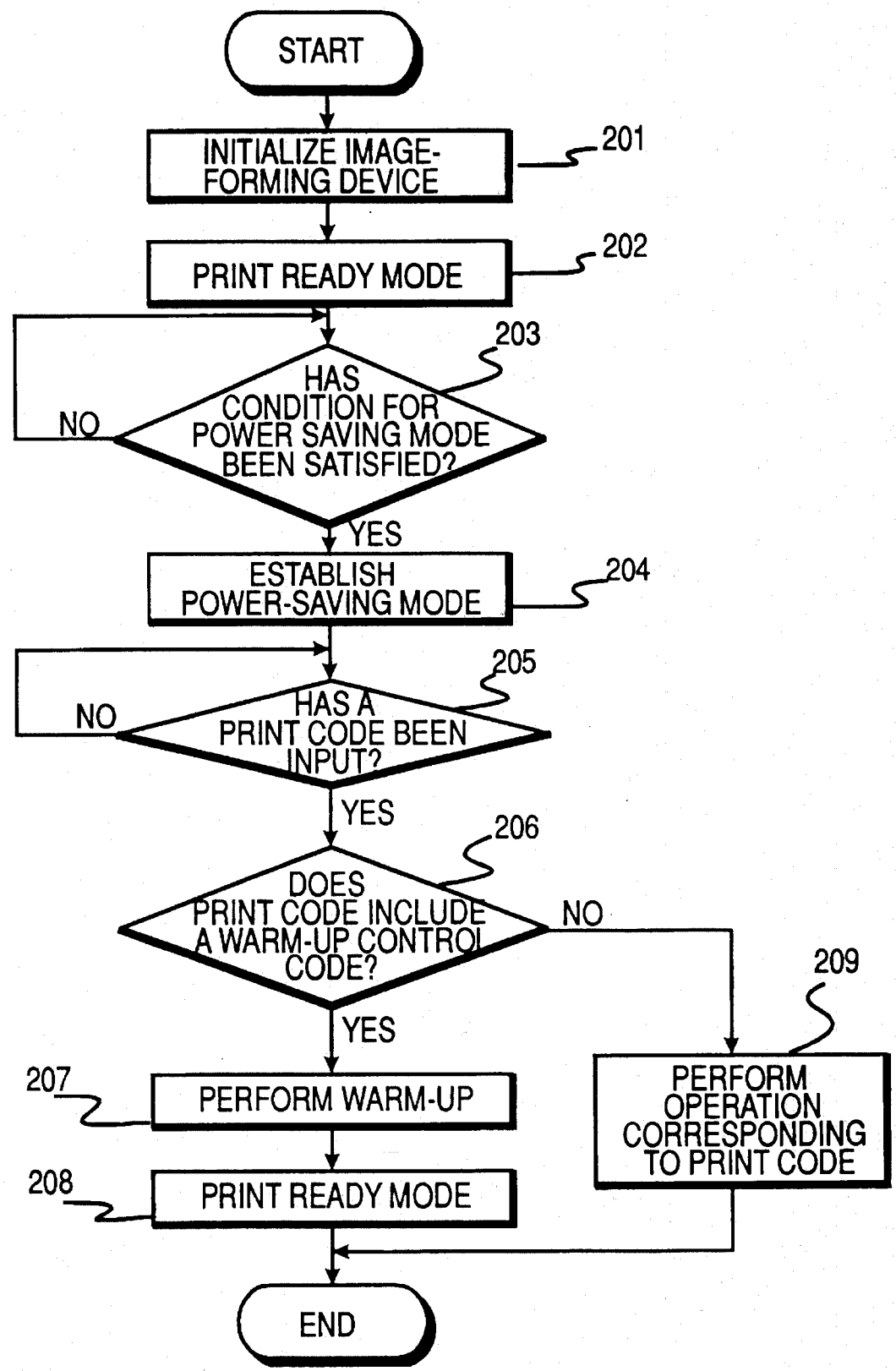
FIG. 5 is a flow chart showing a power-saving print control method according to a second embodiment of the present invention.

Referring to FIG. 5, a flow chart showing a power-saving print control method according to the second embodiment of the present invention is illustrated. In this second embodiment, when a warm-up control code, additionally defined in the normal print code, is input from computer 60, the image-forming device only performs a warm-up operation for printing. This warm-up control code is regarded as one kind of dummy print code.

The control flow chart of FIG. 5 will now be described in detail with reference to FIGS. 1, 2 and 5.

In step 201, video controller 42 initializes the image-forming device upon application of electrical power to the device. At step 202, video controller 42 controls engine unit 30 such that engine unit 30 performs a warm-up operation. During this time, engine controller 21 drives the fixing unit (15*a* and 15*b*) and a fan to enter the print ready mode under the control of video controller 42. Engine controller 21 also keeps video controller 42 informed of the engine condition during this time. Under control of video controller 42, the image-forming device advances to the print ready mode and then proceeds to step 203. In step 203, video controller 42 determines whether conditions for the power-saving mode have been satisfied. Typically, video controller 42 makes this determination by deciding whether a preset time has elapsed while in the print ready mode. If the conditions for the power-saving mode have been satisfied in step 203, the power-saving mode is established in step 204 where video controller 42 controls engine unit 30 to stop heating the fixing unit (15*a* and 15*b*) and to stop operating the fan. Thereafter, in step 205, video controller 42 determines whether a print code has been input from computer 60 while the image-forming device is in the power-saving mode. If a print code has been input in step 205, video controller 42 proceeds to step 206. While a user works on computer 60, if the image-forming device is to be warmed-up in order to perform a print operation after a predetermined period of time, the user enters a preset specific input into computer 60 using an input device, such as a keyboard. If the preset specific input is entered, computer 60 transmits the specific print code to the image-forming device. The content of the specific print code will be described in the following description. In step 206, video controller 42 determines whether a warm-up control code is included in the print code. If the wake-up control code is included, video controller 42 proceeds to step 207, where engine controller 21 is driven through engine interface 46 to perform the warm-up operation. That is, video controller 42 generates and transmits a warm-up signal to engine unit 30 through engine interface 46, thereby enabling performance of the warm-up operation. During this time, engine controller 21 drives the fan and outputs a lamp enable signal to heat lamp controller 22. Heat lamp controller 22 receives the lamp enable signal and heats the heating lamp in heat roller 15*a* of the fixing unit. After the warm-up operation has been performed, video controller 42 advances the image-forming device to the print ready mode in step 208.

If, in step 206, however, the warm-up control code is not included in the print code, video controller 42 advances to step 209 where video controller 42 enables performance of the operation corresponding to the print code. Specifically, video controller 42 generates and transmits the warm-up signal to engine unit 30 through engine interface 46. Engine controller 21 outputs a lamp enable signal to heat lamp controller 22 and drives the fan. Heat lamp controller 22 receives the lamp enable signal and heats the heat lamp in heat roller 15*a* of the fixing unit. That is, heater lamp controller 22 raises the temperature of the heat lamp to a level sufficient for printing, thereby performing the warm-up operation. Accordingly, in step 209, video controller 42 first executes the warm-up operation, and then enables performance of the operation corresponding to the input print code.

As described above, the present invention has merit in that when a print ready mode exists for a given period of time without the performance of any printing operation, the image-forming device advances to a power-saving mode. Then, when a print code including a warm-up control code is input to the image-forming device while in the power-saving mode, the warm-up operation is performed and the print ready mode is established. If, however, the print code is input without the warm-up control code, an operation corresponding to the print code is performed after the warm-up operation is executed. Accordingly, printing time can be reduced.

As a result, in a printing system comprised of a computer and an image-forming device, when a dummy print code performing a warm-up operation, but not a printing operation, is transmitted from the computer to the image-forming device before the printing operation, the warm-up operation for the image-forming device is completed before printing so that the printing operation commences without delay.

What is claimed is:

1. A power-saving printing method of a printing system comprised of a computer having input means and output means and an image-forming device for printing information provided from said computer, said method comprising the steps of:

entering a power-saving mode when a print code from said computer is not input to said image-forming device for a predetermined period of time;

inputting a dummy print code which does not perform actual printing from said computer to said image-forming device;

performing a wake-up operation of said image-forming device and establishing a print ready mode when said dummy print code is transmitted to said image-forming device.

2. The method as claimed in claim 1, comprised of interrupting application of electrical power to fixing means within said image-forming device for securing toner upon a printable medium within said image-forming device during said power-saving mode when said print code has not been provided to said image-forming device for said predetermined period of time.

3. The method as claimed in claim 2, wherein said dummy print code is a control code for enabling performance of said warm-up operation of said image-forming device.

4. The method as claimed in claim 2, wherein said dummy print code is a code that does not instruct said image-forming device to form an image upon the printable medium.

5. The method as claimed in claim 2, wherein said dummy print code comprises a predetermined sequence of symbols accompanying said print code.

6. The method as claimed in claim 2, wherein said dummy print code is downloaded from said computer.

7. A power-saving printing method of a computer having input means and output means and providing printing information to an image-forming device, said method comprising the steps of:

determining whether a preset specific input is entered from said input means of said computer;

outputting a dummy print code that does not perform an actual printing operation, to said image-forming device when said preset specific input is entered; and performing a wake-up operation of said image-forming device and establishing a print ready mode without performing the actual printing operation in response to receipt of said dummy print code by said image-forming device.

8. The method as claimed in claim 7, wherein said dummy print code is a code that does not instruct said image-forming device to form an image upon a printable medium.

9. The method as claimed in claim 7, wherein said dummy print code has a value inhibiting formation of an image upon a printable medium during the actual printing operation.

10. The method as claimed in claim 7, wherein said dummy print code is downloaded from said computer.

11. A power-saving printing method of an image-forming apparatus for performing a printing operation by receiving printing information from a computer, said method comprising the steps of:

entering a power-saving mode when a print code from said computer is not input to said image-forming apparatus for a predetermined period of time;

determining whether a dummy print code that does not perform an actual printing operation is input to said image-forming apparatus from said computer; and performing a wake-up operation of said image-forming apparatus and establishing a print ready mode without performing the actual printing operation when said dummy code is input to said image-forming apparatus.

12. The method as claimed in claim 11, wherein said dummy print code is a code that does not instruct said image-forming device to form an image upon a printable medium.

13. The method as claimed in claim 11, wherein said dummy print code has a value inhibiting formation of an image upon a printable medium during the actual printing operation.

14. The method as claimed in claim 11, wherein said dummy print code is downloaded from said computer.

15. A power-saving printing system, comprising:

video control means for detecting entry of a print code defining formation of images upon print media during a print operation, for making a determination of whether said print code contains dummy code that does not result in formation of an image on the print medium during said print operation, and generating a wake-up signal when said print code contains said dummy code;

engine control means for initiating a wake-up operation in response to said wake-up signal; and heat lamp control means for increasing a temperature of a heat roller to a first value corresponding of a print ready mode in response to initiation of said wake-up operation and for increasing said temperature of said heat roller to a second value greater than said first value to enable said formation of images upon the print media during said print operation when said video control means determines that said print code does not contain said dummy code.

16. The power-saving printing system of claim 15, comprising said engine control means enabling performance of said print operation when said video control means determines that said print code does not contain said dummy code.

17. The power-saving printing system of claim 15, comprising said engine control means initiating transport of the print media prior to said formation of images during said print operation.

18. The power-saving printing system of claim 15, comprising said dummy code comprised of a predetermined sequence of symbols accompanying said print code.

* * * * *